Jan. 17, 1928.  DE WITT BARNES  1,656,466
HEADLIGHT ATTACHMENT
Filed April 19, 1926
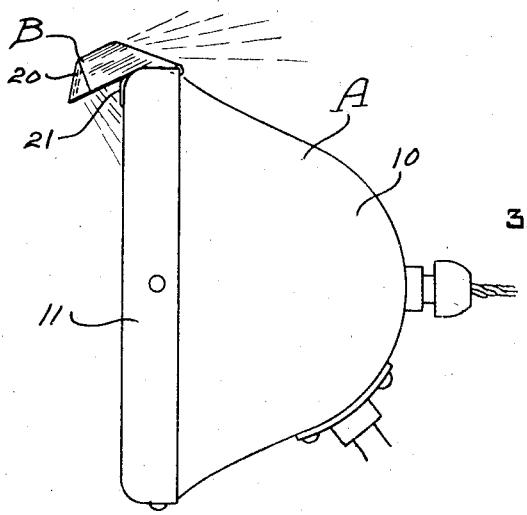
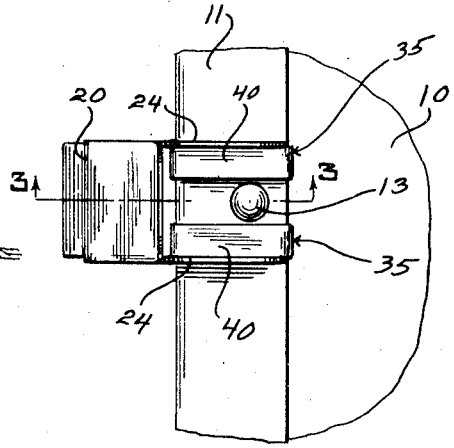
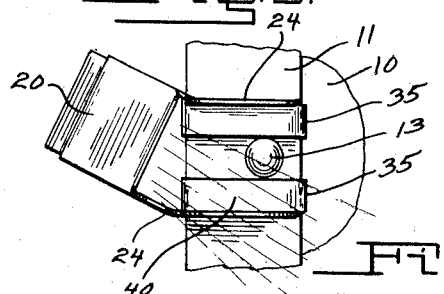
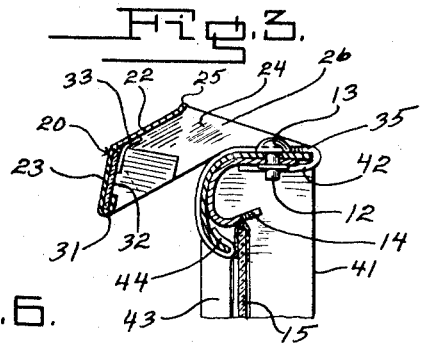
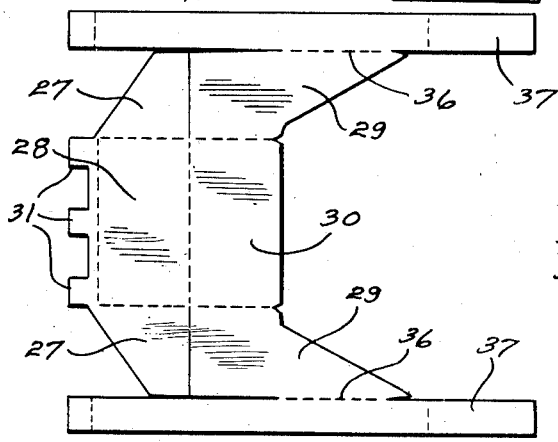
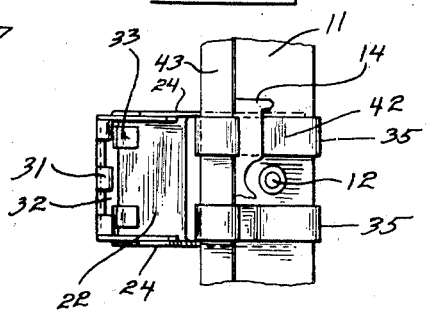
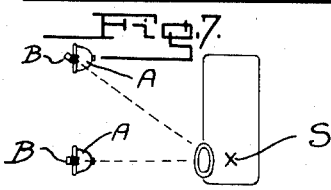
Inventor
DeWitt Barnes
By Lancaster and Allwine
Attorneys Patented Jan. 17, 1928.

1,656,466

UNITED STATES PATENT OFFICE.

DE WITT BARNES, OF CLEVELAND, OHIO.

HEADLIGHT ATTACHMENT.

Application filed April 19, 1926. Serial No. 103,063.

The present invention relates to improvements in headlights for vehicles, and the primary object of the invention is the provision of an indicator attachment for vehicle headlights whereby light rays from the headlights may be reflected rearwardly and be visible to occupants of the vehicle for informing them at all times as to whether the headlights are functioning properly.

A further object of the invention is to provide a vehicle headlight attachment of the aforementioned character which may be stamped from sheet metal, and which is of such construction as to permit of the same being detachably associated with various types of headlights.

A further object of the invention is to provide a novel type of indicator attachment for vehicle headlights which is of such construction as to permit of one of the indicators being applied to each of the headlights and so adjusted as to render each of the indicators visible to the driver of the vehicle.

A still further object of the invention is to provide an indicator attachment for vehicle headlights which is simple in construction, indicators which will be efficient and pleasing in appearance, and which when properly applied to the headlights, only the light from the headlights will be reflected back to the driver.

Other objects and advantages of the invention will be apparent during the course of the following detailed description, taken in connection with the accompanying drawing forming a part of this specification and in which drawing—

Figure 1 is a side elevation of a conventional type of vehicle headlight and showing the indicator attachment applied thereto.

Figure 2 is an enlarged fragmentary top plan view of the forward portion of the headlight and showing the attachment applied thereto.

Figure 3 is a sectional view through the attachment and the retaining rim of the headlight, the section being taken on line 3—3 of Figure 2.

Figure 4 is a bottom plan view of the attachment and showing the same applied to the head light retaining rim.

Figure 5 is a top plan view similar to Figure 2 but showing the casing of the attachment disposed at an angle for deflecting the light rays rearwardly at an angle to the head light.

Figure 6 is a plan view of the blank from which the indicator attachment is formed.

Figure 7 is a diagrammatic view showing the manner in which the attachment may be applied to the head lights at opposite sides of the vehicle for reflecting the light rays rearwardly to a point visible from the driver's seat of the vehicle.

Referring to the drawing in detail, and wherein similar reference characters designate corresponding parts throughout the several views, the letter A may designate a conventional type of vehicle headlight, and B the improved indicator attachment therefor.

The headlight A and which is of ordinary construction, embodies the casing 10 and the bezel or retaining rim 11, the retaining rim being detachably connected with the forward end of the casing 10 and serving to secure the lens in the casing. The rim 11 carries the usual diametrically disposed retaining lugs 12 which are adapted to engage in slots provided in the forward end of the casing 10 and in the well known manner now in common use for detachably connecting the rim to the casing. These lugs 12 are in the form of rivets having heads 13 which project from the peripheral face of the rim and which rivets also serve to secure brackets 14 inwardly of the rim for receiving the lens 15.

Referring now to the attachment B, and which is adapted for detachable connection with the rim 11, the same embodies a hood 20 which projects forwardly of the upper portion of the rim and attaching means 21.

The attachment, and which is formed from a single piece of sheet metal such as illustrated in Figure 6, has the hood 20 thereof formed with a top wall 22, front wall 23, and parallel side walls 24. The parallel side walls 24 project rearwardly past the rear edge 25 of the top wall 22 as clearly illustrated in Figure 3 and provide an opening 26 above the rim 11. The ears 27 which are left at each end of the portion 28 forming the front wall 23, are bent at a right angle to the portion 28 and secured as by soldering or the like to the inner face of the portions 29 which form the side walls 24 of the hood 20. The portion 30 of the blank as illustrated in Figure 6 forms the top wall 22 of the hood. Formed at the outer longitudinal edge of the blank portion 28, is a series of tongues 31 which when the blank is formed into the hood 20 are disposed at the lower edge of the front wall 23. These bendable tongues 31 serve to secure the lower edge of a sheet of mirror glass or the like against the inner side of the front wall 23 and which glass forms a reflecting surface whereby light rays from the lamp A will be reflected rearwardly through the opening 26 in a line of vision of the driver of the vehicle. Suitable strips 33 secured at one end to the under side of the top wall 22, may be employed for securing the upper end of the glass 32. While in the example shown a piece of mirror glass 32 has been disposed inwardly of the front wall 23 for providing a reflecting surface, if desirable the inner surface of the front wall may have a high polish for providing the desired reflecting surface. It will be observed that by so constructing the hood 20, that all extraneous lights such as street lights will be screened from the reflector, and only the light from the head lamp will be reflected back to the driver.

The attaching means 21 in the example shown consist of a pair of bendable straps 35 which are formed integral with the hood 20 and are connected at points intermediate their ends and at one longitudinal edge of the straps to the rear portions of the vertical side walls 24 as along the lines 36. The portions 37 of the blank as shown in Figure 6 form the straps 35. These straps 35 and which extend rearwardly past the rear end of the side walls 24, are bent inwardly toward one another in right angular relation to their respective side walls and are adapted to have their intermediate integral portions 40 engage flat upon the outer surface of the rim 11 to opposite sides of the rivet head 13 as clearly illustrated in Figure 2. Thus it will be seen that upon disposing the portions 40 in surface contact with the rim 11 to each side of the head 13, that circumferential shifting of the attachment will be eliminated. The rearwardly projecting portions of each strap 35 is bent about the rear edge 41 of the rim 11 as at 42 into clamping engagement with the inner surface of the rim, while the forwardly projecting portions of each strap overlie the inturned forward flange 43 of the rim and have their terminal portions clamped about the edge of the rim as at 44. Thus it will be seen that upon clamping the terminal portions of the straps 35 about the edges of the rim 11, that the attachment will be firmly held against shifting transversely of the rim.

In attaching the device to the rim, the rim is first removed from the casing 10 and the straps 35 then disposed transversely of the outer side of the rim with the intermediate integral portions 40 disposed one to each side of one of the rivet heads 13, and then by bending the terminal portions of the straps about the front and rear edges of the rim, securely fasten the attachment to the rim with the hood 20 projecting in right angular relation with the face plane of the rim. The rim may then be applied to the casing 10 with the attachment B at the upper side of the casing as illustrated in Figure 1. This initial positioning of the attachment will cause the light rays to project rearwardly in a line directly above the casing 10, and in order to direct the light rays either to one side or the other so that the rays will be directed toward the driver's seat of the vehicle, the hood 20 may be readily swung in the desired angular relation to the straps 35 by slight bending of the vertical side walls 24 on a vertical line between the rear edge of the top wall 22 and the connection of the rear portions of the side walls with the intermediate integral portions 40. This bending of the side walls 24 for directing the light rays toward the driver's seat, is clearly illustrated in Figure 5, and by reference to the diagrammatic showing in Figure 7, it will be seen how the hoods 20 when mounted upon the head light may be so disposed as to have their light rays intersecting one another at the driver's seat S. From observing the diagrammatic showing in Figure 7, it will readily be apparent that it is desirable to dispose the hood 20 at different angles with respect to the face plane of the lamp A, and for this reason the hoods 20 have been so formed with vertical side walls which may be readily bent on vertical lines for disposing the hoods in a position to reflect the light rays rearwardly to a point at the driver's seat of the vehicle.

From the foregoing description it will be apparent that a novel type of indicator attachment for headlights has been provided whereby the driver will at all times be able to tell as to whether his headlights are functioning properly, and which attachments are of such construction as to permit of their being disposed in proper angular relation to the headlights for causing the light rays to be reflected rearwardly to a desired position or section of the vehicle and preferably to that point wherein the driver's seat is located.

Changes in detail may be made to the specific form of the invention herein shown and described, without departing from the spirit of the invention or the scope of the following claim.

I claim:

A headlight indicator comprising a one piece hood embodying a top wall, vertical side walls, and a depending front wall having ears formed at each end thereof for securing to said side walls and having integral tongues provided along its lower marginal edge, a reflector disposed in surface contact with the inner surface of the front wall and secured along its lower edge by said tongues, and means carried by said side walls for detachably securing the indicator to the upper portion of a headlight.

DE WITT BARNES.